(12) United States Patent
Brummel et al.

(10) Patent No.: US 9,217,682 B2
(45) Date of Patent: Dec. 22, 2015

(54) TORQUE SENSOR ARRANGEMENT AND SHAFT COMPRISING A TORQUE SENSOR ARRANGEMENT

(75) Inventors: Hans-Gerd Brummel, Berlin (DE); Jürgen Götz, Höchstadt/Aisch (DE); Uwe Linnert, Fürth (DE); Carl Udo Maier, Stuttgart (DE); Jochen Ostermaier, Erlangen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 110 days.

(21) Appl. No.: 14/115,203

(22) PCT Filed: Apr. 10, 2012

(86) PCT No.: PCT/EP2012/056448
§ 371 (c)(1),
(2), (4) Date: Nov. 1, 2013

(87) PCT Pub. No.: WO2012/152515
PCT Pub. Date: Nov. 15, 2012

(65) Prior Publication Data
US 2014/0260685 A1 Sep. 18, 2014

(30) Foreign Application Priority Data
May 6, 2011 (DE) .......................... 10 2011 075 400

(51) Int. Cl.
*G01L 3/00* (2006.01)
*G01L 3/10* (2006.01)
*F16C 3/02* (2006.01)

(52) U.S. Cl.
CPC . *G01L 3/101* (2013.01); *F16C 3/02* (2013.01); *G01L 3/102* (2013.01)

(58) Field of Classification Search
CPC .................................. G01L 3/101; G01L 3/00
USPC ..................................................... 73/862.333
See application file for complete search history.

(56) References Cited

U.S. PATENT DOCUMENTS

| 5,426,986 | A | * | 6/1995 | Brassert et al. ............. 73/862.09 |
| 6,047,605 | A | * | 4/2000 | Garshelis ................. 73/862.336 |
| 8,726,715 | B2 | * | 5/2014 | Cottogni ........................ 73/1.09 |
| 2011/0017013 | A1 | * | 1/2011 | Bader .......................... 74/606 R |
| 2013/0291657 | A1 | * | 11/2013 | Purekar et al. ........... 73/862.333 |

FOREIGN PATENT DOCUMENTS

| CN | 1056125 | A | 11/1992 |
| CN | 1946545 | A | 4/2007 |
| CN | 101050795 | A | 10/2007 |
| DE | 2636086 | A1 | 2/1978 |
| DE | 102009008074 | A1 | 8/2010 |
| GB | 2281974 | A | 3/1995 |
| JP | S59142739 | U | 9/1984 |

(Continued)

*Primary Examiner* — Lisa Caputo
*Assistant Examiner* — Jamel Williams

(57) ABSTRACT

A torque sensor arrangement including a contactless torque sensor, in which the torque sensor is arranged on an electrically operating linear carriage is provided. A distance sensor is also arranged on the linear carriage such that it allows the distance to the object of which the torque is to be determined to be measured.

15 Claims, 2 Drawing Sheets

(56) References Cited

FOREIGN PATENT DOCUMENTS

| | | |
|---|---|---|
| JP | S60088335 A | 5/1985 |
| JP | S63033634 A | 2/1988 |
| JP | H04299226 A | 10/1992 |
| JP | H05126655 A | 5/1993 |
| JP | H07167729 A | 7/1995 |
| JP | H08136375 A | 5/1996 |
| JP | 2000019032 A | 1/2000 |
| RU | 2342632 C2 | 12/2008 |

* cited by examiner

TORQUE SENSOR ARRANGEMENT AND SHAFT COMPRISING A TORQUE SENSOR ARRANGEMENT

CROSS REFERENCE TO RELATED APPLICATIONS

This application is the US National Stage of International Application No. PCT/EP2012/056448 filed Apr. 10, 2012 and claims benefit thereof, the entire content of which is hereby incorporated herein by reference. The International Application claims priority to the German application No. 102011075400.8 DE filed May 6, 2011, the entire contents of which is hereby incorporated herein by reference.

FIELD OF INVENTION

The present invention relates to torque sensor arrangement with a torque sensor operating in a non-contact manner. In addition the invention relates to a shaft with a shaft section having a torque sensor arrangement.

BACKGROUND OF INVENTION

The permeability of ferromagnetic materials is influenced by mechanical strains. This physical effect, which is known as the magnetoelastic effect, can be utilized for measuring torque in a rotating object, since a torque creates strains in the rotating object. A series of different sensors are known which make use of the magnetoelastic effect in order to detect torques, of shafts for example, in a non-contact manner. The magnetoelastic sensors are characterized by their high accuracy, wherein a recalibration is required just as little as movement towards reference marks.

A magnetoelastic torque sensor, which is used for measuring the torque of drive shafts, is known for example from DE 10 2009 008 074 A1. This document describes a measurement arrangement for detecting the torque of a shaft, which includes a torque sensor positioned with a prespecified gap from the surface of the shaft.

To measure torques on force-transferring shafts of machines, an electromagnetic coil is arranged at a small distance from the surface of the shaft without being in contact with it, which reacts to the change of permeability in a ferromagnetic layer on the shaft or a ferromagnetic shaft per se with a change in its signal. For this purpose the shaft must be subjected to torsional strains, i.e. the magnetoelastic torque sensor must be arranged along the shaft between a driving torque and the opposing reaction torque acting against it. This means that the shaft formed from the ferromagnetic material is part of the measurement apparatus.

If positional changes of the shaft occur during the measurement the measurement result, which reacts very sensitively to the distance between the sensor and the shaft, will be influenced by the position changes. Movements by few tenths of millimeters perpendicular to the axis of rotation of the shaft already reduce the measurement accuracy of the torque sensor significantly. Especially with technical applications in which shafts with large dimensions are used for force transmission, such positional changes of the shaft cannot be rectified with an economically justifiable technical effort. It has therefore been proposed in DE 10 2009 008 074 A1 that the torque sensor be positioned on the shaft by means of a ring surrounding said shaft. The ring is also connected to a housing section to prevent it from rotating along with the shaft. In this case it is able to be pivoted around a pivot axis and is attached movably to the housing section in the radial direction of the shaft, so that it can make the same movements as the shaft. In such cases the ring is supported on the shaft by a support bearing, by shell bearings or by roller bearings.

In the light of the prior art described, the object of the present invention is to make available an advantageous torque sensor arrangement with a non-contact torque sensor. A further object of the invention is to make available an advantageous shaft.

SUMMARY OF INVENTION

The first object is achieved by a torque sensor arrangement as claimed in the claims, the second object by a shaft as claimed in the claims. The dependent claims contain advantageous embodiments of the invention.

An inventive torque sensor arrangement has a torque sensor operating as a non-contact sensor. Said sensor is disposed on an electrically-operated linear carriage.

The arrangement of the torque sensor on an electrically-operated linear carriage makes it possible to keep the distance between the torque sensor and the object to be measured, which can especially be a shaft, in a range suitable for the measurement, even if the object position varies. In this case it is not necessary to position the torque sensor on the shaft by means of a ring surrounding said shaft. It is therefore also not necessary to provide an additional roller bearing or similar on the shaft, which would lead to additional wear.

Advantageously the inventive torque sensor arrangement also includes a distance sensor, which together with the torque sensor, is disposed on the linear carriage such that it allows the measurement of the distance to the object of which the torque is to be determined. In this way it is possible to set the distance between the torque sensor and the object precisely and to detect any variations in distance that may occur and take them into account in the evaluation of the measurement signal. If a control unit is also present, which is connected to the distance sensor and is connected to the linear carriage for output of a control signal, an automatic movement towards the object with the torque sensor is made possible. The control unit in such cases determines the control signal on the basis of the distance signal output by the distance sensor, wherein the control signal represents a displacement of the torque sensor by means of the electrically-driven linear carriage by an amount which guides the torque sensor by a predetermined distance towards the object.

In a development of the inventive torque sensor arrangement the distance between the torque sensor and the object can be kept constant during the measurement or be kept within a predetermined distance interval. To this end the control unit determines the control signal on the basis of the deviation of the distance measured with the aid of the distance sensor from a predetermined setpoint distance. The control signal then represents that displacement of the torque sensor by means of the electrically-operated linear carriage which is necessary to keep the torque sensor at the setpoint distance or to keep it within the predetermined distance interval. When reference is made below to the setpoint distance, this should also always be taken to include the case of a distance interval which specifies the permissible distances of the torque sensor for the object to be measured.

The inventive torque sensor arrangement can also include a non-contact temperature sensor, which is disposed such that it allows the measurement of the temperature of the object of which the torque is to be determined. The measurement of the temperature is advantageous because the temperature of the object of which the torque is to be measured has an influence on the measurement. The data measured by the torque sensor can therefore be corrected if necessary on the basis of the temperature. An infrared sensor is suitable as a temperature sensor for example.

To protect the torque sensor and the object of which the torque is to be determined, the torque sensor can if necessary be disposed together with the distance sensor and/or the temperature sensor on a further linear carriage which is disposed on the electrically-driven linear carriage, able to be moved in the same direction as said carriage. By means of a spring the further linear carriage is pushed into a stop position on the electrically-driven linear carriage. It can be moved away against the force of the spring from this stop position. If for example, as a result of a sudden movement of the object of which the torque is to be measured, there is contact between the sensor and the object, this further linear carriage allows the torque sensor to avoid the object, by which damage to the object can be especially avoided. In order to also enable damage to the torque sensor and if necessary the distance sensor and/or the temperature sensor to be avoided, the torque sensor can be assigned a spacer, if necessary together with the distance sensor and/or if necessary together with the temperature sensor, which projects in one direction beyond the torque sensor and if necessary beyond the distance sensor and/or beyond the temperature sensor, in which the object of which the torque is to be measured is to be disposed in relation to the torque sensor. In the event of contact with the object, said contact does not occur directly with the torque sensor, but with the spacer, so that the torque sensor and if necessary the distance sensor and/or the temperature sensor are protected from damage. The spacer can for example be a metal ring surrounding the torque sensor, if necessary together with the distance sensor and/or if necessary together with the temperature sensor, the axial direction of which corresponds to the direction of movement of the electrically-operated linear carriage.

In order to protect the torque sensor and if necessary the distance sensor and/or the temperature sensor against environmental influences, a housing with at least one opening for the torque sensor and if necessary an opening for the distance sensor and/or if necessary an opening for the temperature sensor can be provided. The openings for the torque sensor, the distance sensor and the temperature sensor can in such cases be openings separated from one another or a common opening for all sensors. The electrically-driven linear carriage has a measurement position in which the torque sensor, if necessary together with the distance sensor and/or the temperature sensor is disposed in the area of the opening, so that the housing does not hinder the measurement. In particular the spacer can project beyond the housing when the electrically-driven linear carriage is in the measurement position.

The further linear carriage and the spacer enable a passive protection of the object for which the torque is to be determined or of the sensor or of the sensors to be achieved in the event of an unintentional contact. It is desirable however to avoid any contact between the object and the torque sensor arrangement if possible. For this purpose an active protection device can be present, which is connected to the distance sensor for receiving its distance signal. The protective device monitors the distance to the object of which the torque is to be determined and moves the linear carriage away from the object if the distance falls below a predetermined minimum distance. This active protection device can be present as the sole protection of the object and measuring arrangement, however it can also be present in addition to the further linear carriage and/or the spacer. In the latter case the further linear carriage and/or the spacer offer an additional passive protection for the case in which a movement of the shaft takes place which is too fast for the active protection device to withdraw the electrically-operated linear carriage.

The torque sensor arrangement can be equipped with an evaluation unit which is connected to the torque sensor and the distance sensor for receiving the respective signals and determines the torque of the object of which the torque is to be determined taking into account the distance from the object. In addition or as an alternative an evaluation unit can be present which is connected to the torque sensor and the temperature sensor for receiving the respective signals and determines the torque of the object of which the torque is to be determined taking into account the temperature of the object. If both a temperature sensor and also a distance sensor are present, the evaluation unit can especially be connected both to the temperature sensor and also to the distance sensor in order to receive their respective measurement signals and to determine the torque while taking account of both the distance to and also the temperature of the object.

A magnetoelastic torque sensor is especially suitable as the torque sensor of the inventive torque sensor arrangement if the object to be measured consists of ferromagnetic material or has a ferromagnetic surface layer.

In accordance with the invention a shaft with at least one shaft section is additionally provided, having at least one inventive torque sensor arrangement. In particular at least two inventive torque sensor arrangements can be present in the shaft section. More than two torque sensor arrangements are also possible however. If at least two torque sensor arrangements are present, these can for example be distributed evenly over the circumference of the object of which the torque is to be determined. The distribution of the number of torque sensor arrangements increases the redundancy and makes it possible, by comparing the torques detected by means of the different torque sensor arrangements, to detect an error in the torque sensor determination at an early stage.

The inventive shaft is especially suitable for use in combined-cycle power plants which are equipped with so-called single-shaft bearings. In such combined-cycle power plants the steam turbine and the gas turbine are disposed on a common shaft which transmits the torque to the generator. To optimize the operation of such a combined-cycle power plant it is useful to know the individual powers of the steam turbine and the gas turbine. Previously only the total power has been determined from the generator power. The individual powers of the steam turbine and the gas turbine are then determined by computation on the basis of a model. The precise circumstances on the shaft sections belonging to the steam turbine and the shaft sections belonging to the gas turbine are currently not able to be determined directly.

By means of the inventive torque sensor the direct determination of the individual outputs of the steam turbine and the gas turbine is possible if at least one inventive torque sensor arrangement is present in each case both in the steam turbine shaft section and also in the gas turbine shaft section.

BRIEF DESCRIPTION OF THE DRAWINGS

Further features and advantages of the invention will emerge from the description of exemplary embodiments provided below, with reference to the enclosed figures

DETAILED DESCRIPTION OF INVENTION

Figure 1:
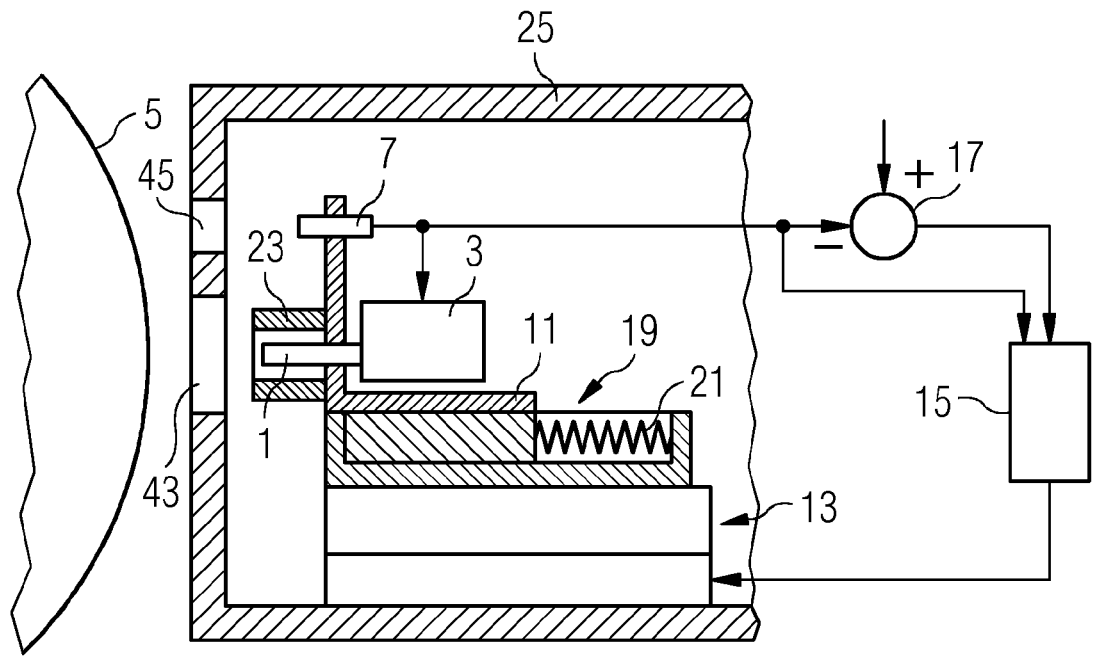
FIG. 1 shows an inventive torque sensor arrangement in the idle position.
Figure 2:
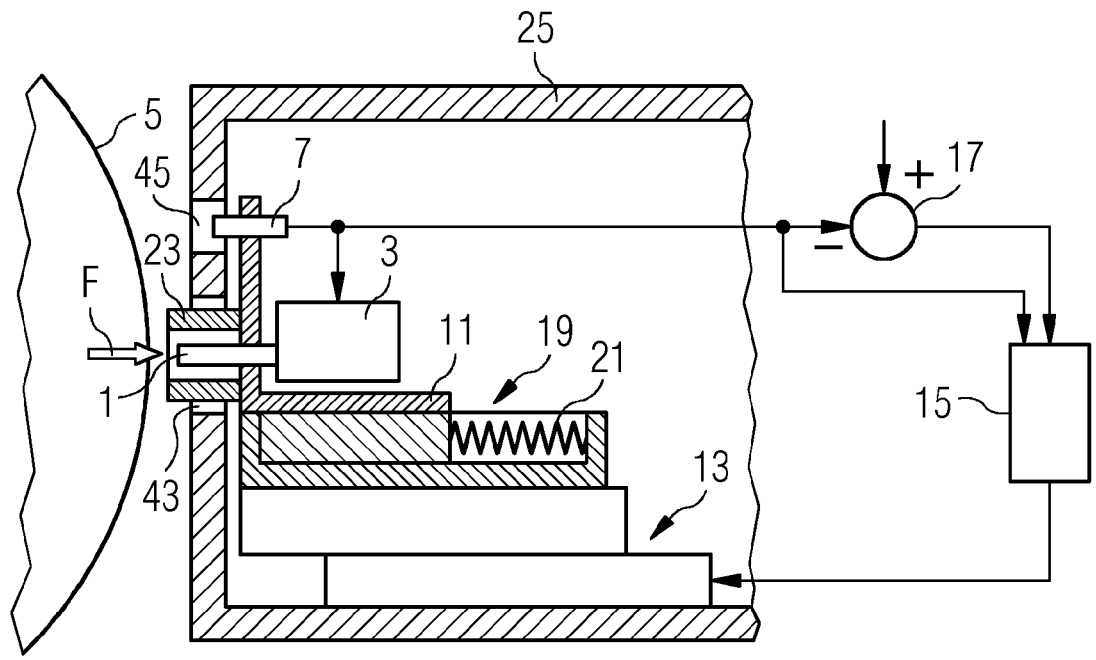
FIG. 2 shows the torque sensor arrangement from FIG. 1 in the measurement position.
Figure 3:
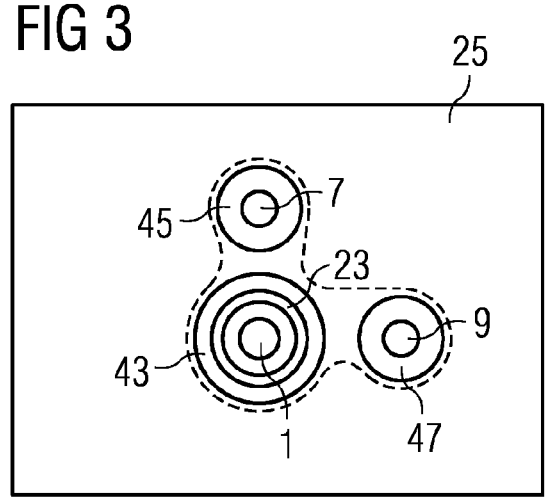
FIG. 3 shows a schematic of the torque sensor arrangement from FIG. 1 viewed from the object of which the torque is to be determined.

An exemplary embodiment for an inventive torque sensor arrangement will now be described below with reference to FIGS. 1 to 3. While FIG. 1 shows the torque sensor arrangement in the idle position, FIG. 2 shows the arrangement in the measurement position. FIG. 3 shows a view of the sensor arrangement from the direction of the object of which the torque is to be determined.

The inventive torque sensor arrangement comprises a torque sensor 1 which, in the present exemplary embodiment, is a magnetoelastic torque sensor. Such a sensor is based on the inverse magnetostrictive effect, i.e. the effect that ferromagnetic materials experience a change in their magnetic susceptibility when they are subjected to mechanical strains. Since mechanical strains, in addition to being induced by tensile forces and compressive forces, are also induced by torsion, the magnetostrictive effect can be employed for torque measurement, in order to measure torques of rotating objects having at least one ferromagnetic surface layer, by non-contact means.

The torque sensor 1 is connected to an evaluation unit 3 which receives the signals detected by the magnetoelastic torque sensor and determines them in respect of the torque of the object, in the present exemplary embodiment a shaft 5, which in the present exemplary embodiment consists of a ferromagnetic material. Since the inverse magnetostrictive effect also depends on the distance of the sensor 1 from the object 5 and on its temperature, the torque sensor arrangement also includes a distance sensor 7 as well as a temperature sensor 9 (see FIG. 3) which measure the distance and temperature in a non-contact manner. The non-contact distance measurement can be undertaken on the basis of runtime measurements or phase position measurements by means of electromagnetic waves such as radio waves, light waves or infrared waves for example, or by means of ultrasound waves. A pyrometer can be employed for example for non-contact temperature measurement. The evaluation unit 3, as well as being connected to the torque sensor 1, is also connected to the distance sensor 7 and the temperature sensor 9 for receiving the corresponding measurement signals. This enables the torque to be determined taking into account the current distance between the torque sensor 1 and the object 5 or the current temperature of the object. If it can be ensured that a variation in the distance is not occurring or is only occurring within limits that can be tolerated within the framework of the measurement accuracy, taking account of the distance in the evaluation of the signal of the torque sensor 1 can be dispensed with. Accordingly the measurement of the temperature can be dispensed with if the temperature is sufficiently constant not to contribute to a falsification of the measurement beyond the precision needed.

The respective sensors present, i.e. at least the torque sensor 1 and in the present exemplary embodiment also the distance sensor 7 and the temperature sensor 9, are disposed on a holder 11 in a fixed spatial relationship to one another. The holder 11 with the sensors 1, 7, 9 is mounted on an electrically-operated linear carriage 13. This serves to position the sensors in front of the object 5 with the aid of the distance sensor 7 and a control circuit. To this end the control circuit comprises a control unit 15 and an adder 17 which are connected to the distance sensor 7 for receiving the distance signal. The adder has an inverting input to which the distance signal is applied and a non-inverting input to which a setpoint signal representing the setpoint distance is applied. The difference between setpoint signal and distance signal is then forwarded to the control unit 15, which on the basis of this difference generates a control signal for the electrically-driven linear carriage 13, which represents the displacement that is necessary to bring the torque sensor 1 to the setpoint distance or to keep it at this distance.

In the present exemplary embodiment an active protection function is also implemented in the closed-loop control unit 15, so that it also serves as an active protection device. This protection function monitors the current distance from the object 5 and rapidly withdraws the electrically-operated linear carriage 13 from the working position shown in FIG. 2 if a minimum safety distance is reached or exceeded. Such reaching or falling below the minimum safety distance can occur with movements of the object 5. In the startup phase of a combined-cycle power plant for example the oil pressure can cause the shaft to float, which can under some circumstances trigger such movements.

In the present exemplary embodiment the holder 11 with the sensors 1, 7 and 9 is not disposed directly on the electrically-operated linear carriage 11 but on a sprung carriage 19 which is pushed by means of the spring 21 into a forward stop position of the electrically-operated linear carriage 13, as is shown in FIGS. 1 and 2. It can be pushed against the force of spring 21 out of this forward. Position, when a force F defined by the spring constant of the spring 21 (cf. arrow in FIG. 2) acts on the holder 11 with the sensors 1, 7, 9. This sprung carriage 19 thus fulfills a passive protection function, since it yields in the event of contact between a sensor and the object 5 and thus prevents greater damage, if the active protection device described in this paragraph is not able to react quickly enough, which for example is possible in the case of the object 5 approaching the torque sensor 1 at a speed that is to rapid for the electrically-operated carriage 13.

As a further passive protection system the sensor arrangement includes a protective ring, which is disposed on the holder 11 surrounding the torque sensor 1. The protective ring projects in this case beyond the forward end of the torque sensor 1 so that in the event of a contact with the object 5 of which the torque is to be determined, the torque sensor 1 is protected from damage. In particular the combination of all three safety functions represents good protection both for the object 5 and also for the torque sensor 1 in the event of unintentional contact. If the distance sensor 7 or the temperature sensor 9 project as far beyond the holder as the torque sensor 1, these sensors can also be provided with such a protective ring. However as a rule it is sufficient for that sensor which comes closest to the object 5 during the operation of the torque sensor arrangement to be provided with a protective ring. This is usually the torque sensor 1.

The holder 11 with the sensors 1, 7, 9 of the electrically-operated linear carriage 13 and also of the sprung linear carriage 19 are disposed in a housing 25, which protects these elements against environmental influences. In the present exemplary embodiment the evaluation unit 3 as well as the closed-loop control circuit is also disposed in this housing. The housing 25 possesses openings 43, 45, 47 which allow the respective sensor to pass through the housing or make a direct view of the object 5 possible.

If the measurement is to be started during the operation of the torque sensor arrangement, the sensors 1, 7, 9 are positioned with the aid of the electrically-operated linear carriage and the distance sensor 7 as well as the closed-loop control circuit at a setpoint distance in front of the object 5. The data of the sensors is detected and is put into the desired file format by corresponding conversion algorithms. Since the measured values of the magnetoelastic torque sensor 1 depend on the temperature of the object 5 and the distance of the torque sensor 1 from the object, in the present exemplary embodiment the temperature and the distance are taken into account in the evaluation algorithm of the evaluation unit 3. Although the distance is set and kept constant with the aid of the electrically-operated linear carriage 13, it is additionally taken into account in the evaluation algorithm however, which in the event of distances fluctuating within permissible limits, in which no repositioning is undertaken with the aid of the electrically-operated linear carriage 13, leads to a high precision of the torque measurement. The data for the correction of the signals delivered by the torque sensor 1 can be obtained from a one-off calibration after the installation of the sensor arrangement. If the object 5 changes its position during the torque measurement, this can therefore be compensated for solely by the algorithm for small movements. For larger movements of the object 5 the position can be regulated with the aid of the electrically-operated linear carriage 13.

Unlike in the exemplary embodiment shown in FIGS. 1 to 3, the evaluation unit 13 can be disposed outside the housing 25, for example in an industrial computer. In this case the sensor arrangement is equipped with a data capture module which digitizes analog sensor signals and passes them on to a data-processing model disposed at remote location, for example a data-processing model disposed in the industrial computer. The data-processing module can be realized in such cases as hardware or software. In the data-processing module the data is evaluated with the corresponding algorithms and the results are sent to the control center. The closed-loop control circuit for controlling the electrically-operated linear carriage 13 and/or the active safety function can also be integrated into the data-processing module. This embodiment is especially worthwhile if the housing 25 of the torque sensor arrangement is only to contain the necessary elements or if the evaluation and the control of the electrically-operated linear carriage 13 is to be centralized.

Figure 4:
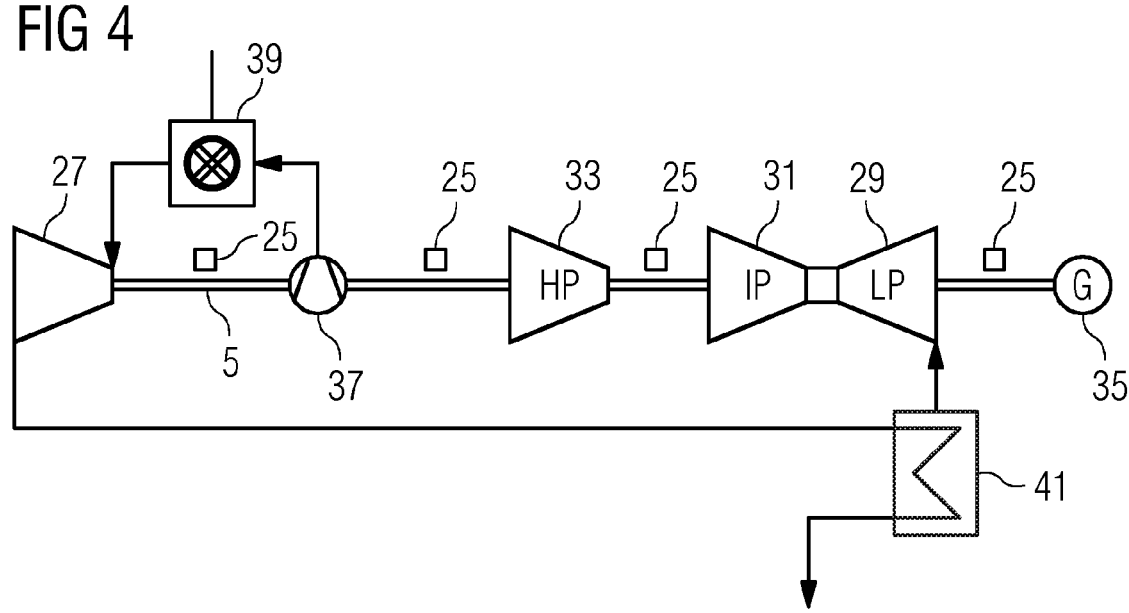
FIG. 4 shows a combined-cycle power plant with a shaft having a number of inventive torque sensor arrangements.
Figure 5:
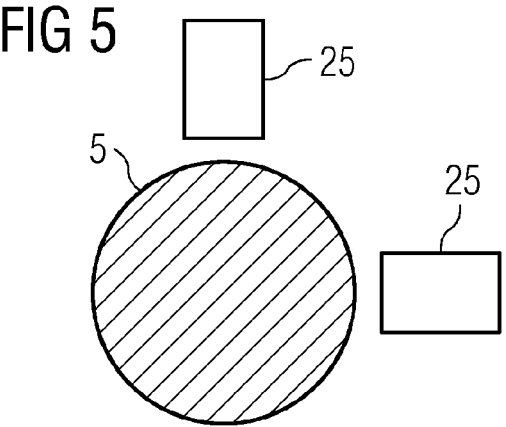
FIG. 5 shows the disposition of the torque sensor arrangements in a cross section through the shaft.

An example of an application for the inventive torque sensor arrangement is shown in FIGS. 4 and 5. These figures show a combined-cycle power plant which is constructed in accordance with the single-shaft system concept. This means that both the gas turbine 27 and also the steam turbine, which in the present exemplary embodiment comprises a turbine for low-pressure 29, a turbine for medium pressure 31 and a high-pressure turbine 33 in each case, are disposed together with the generator 35 and the compressor 37 for the gas turbine 27 on a common shaft 5. The gas turbine 27 is driven by means of the combustion gases of an air-fuel mixture burnt in a combustion chamber 39, the steam turbine is driven by means of steam which is generated in a steam generator 41 with the aid of the waste heat of the gas turbine 27. In systems of this type it is sensible for optimization of operation to know the individual power of the steam and gas turbines in each case. Previously these powers have been determined from the generator power and a model. The precise conditions at the individual shaft sections are not currently known.

In the present exemplary embodiment the respective torques of individual shaft sections are determined with the aid of inventive torque sensor arrangements. To this end torque sensor arrangements (only shown with their housing 25 in FIGS. 4 and 5) are disposed on different sections of the shaft 5, as is shown in FIG. 4. In this figure the locations of the torque sensor arrangements shown in the figure merely represent examples of possible positions. In particular a torque sensor arrangement 25 does not have to be present at each of the locations shown. The locations at which torque sensor arrangements 25 are present generally depends on the shaft sections from which information about the torque is to be detected.

Basically it is sufficient for a single torque sensor arrangement 25 to be present on one section of the shaft 5. In order to achieve an increased redundancy, it can however be advantageous to arrange at least 2 torque sensor arrangements 25 around the circumference of the shaft 5, as is shown by way of example in FIG. 5. In this case an arrangement is selected in FIG. 5 which also makes it possible, in the event of an oscillation of the shaft 5, to determine the direction of the oscillation via the distance sensors 7 of the torque sensor arrangements. In order to achieve this it is necessary for the torque sensor arrangements 25 not to lie on a common line through the shaft center point. Although they also do not have to be arranged at an angle of 90° to one another, this is an advantageous arrangement if two-dimensional oscillation patterns are to be determined. It is also possible, instead of the two torque sensor arrangements 25 depicted in FIG. 5, to provide three or more torque sensor arrangements, which can for example be distributed at regular intervals around the circumference of the shaft 5. However two torque sensor arrangements are already sufficient in terms of redundancy.

The torque sensor arrangement described with reference to FIGS. 1 to 3, as well as the shaft described with reference to FIGS. 4 and 5, represent typical embodiments of the invention, which can also be modified however. Thus the housing 25 in the present exemplary embodiment has three separate openings 43, 45, 47 for the torque sensor 1, the distance sensor 7 or the temperature sensor 9 respectively. In the case of the distance sensor 7 and the temperature sensor 9, the respective opening can also be closed off with a transparent plate for electromagnetic waves in the frequency range used by the sensor. Basically however a common opening for all three sensors can also be present, as is shown by a dashed lines in FIG. 3. Accordingly the protective ring can also extend around all three sensors, especially if the distance sensor 7 and the temperature sensor 9 project just as far beyond the holder 11 as the torque sensor 1. Furthermore the possibility also exists, instead of providing a protective ring 23, of merely providing a spacer in the form of a pin, a part ring or any other suitable geometrical shape. In such cases it merely has to be ensured that the spacer, in the event of the object for which the torque is to be determined and the torque sensor arrangement coming too close to one another, comes into contact with the object first of all. In addition the stability and shape of the spacer should guarantee that this does not break and might possibly damage the object in the event of contact.

There can also be variations from the shaft depicted in FIG. 4 and FIG. 5. Thus the shaft does not absolutely have to be a shaft of a combined-cycle power plant. If the shaft is part of a combined-cycle power plant, the number of turbines in the steam area of the power plant can differ from that shown in FIGS. 4 and 5. Likewise it is not necessary for the shaft to consist entirely of ferromagnetic material. It is sufficient for it to possess a ferromagnetic surface layer in the measurement area. In addition there is also the possibility, as an alternative or in addition to the redundant torque sensor arrangements disposed around the circumference, to arrange different torque sensor arrangements in the axial direction of the shaft 5 next to one another. Finally it is pointed out that the arrangement shown in FIG. 4 merely represents one of a number of possible single-shaft system designs. In an alternative design the generator can be disposed between the gas turbine and the steam turbines, wherein a coupling can then also be present between a generator and the steam turbines.

The present invention makes possible simple installation and largely trouble-free operation of a torque sensor, for measurement of torques in shaft sections of the shaft of a combined-cycle power plant with a single-shaft system design. This is achieved by disposing the sensors on an electrically-operated linear carriage, with the aid of which the sensors can be positioned on the shaft and which withdraws the sensors into a housing for protection when not in use or in the event of a fault. The construction also contains a sprung mechanism which absorbs unexpected impacts from the shaft on the sensor. Should this occur, a metal ring or another suitable spacer at least protects the torque sensor from damage by absorbing the impact. In addition a closed-loop control is present, which withdraws the sensor into the housing if the distance falls below a safety distance. In startup mode of combined-cycle power plants with single-shaft system designs in particular such a construction offers advantages, since the shaft can float on start-up and the distance between sensor and shaft changes in such cases. The layout of the torque sensor arrangement and the manner of the measurement are designed so that the greatest possible precision of the measurement of the torsion moments and torsion oscillations of the shaft is possible.

The invention claimed is:

1. A torque sensor arrangement, comprising:
   a torque sensor operating in a non-contact manner, wherein the torque sensor is disposed on an electrically-operated linear carriage wherein a distance sensor is also arranged on the linear carriage such that it allows a distance to the object of which the torque is to be determined, to be measured; and
   a control unit, which is connected to the distance sensor, and to the linear carriage for output of a control signal, and determines a control signal on the basis of a distance signal output by the distance sensor,
   wherein the control signal represents a displacement of the torque sensor by means of the electrically-operated linear carriage by an amount which moves the torque sensor to a predetermined distance from the object.

2. The torque sensor arrangement as claimed in claim 1, wherein the control unit determines the control signal on the basis of a deviation of the distance from the predetermined setpoint distance determined by means of the distance sensor, and
   wherein the control signal represents that displacement of the torque sensor by means of the electrically-operated linear carriage which is needed to keep the torque sensor at the setpoint distance.

3. The torque sensor arrangement as claimed in claim 1, further comprising a non-contact temperature sensor which is disposed such that it allows the non-contact measurement of the temperature of the object of which the torque is to be determined.

4. The torque sensor arrangement as claimed in claim 3, wherein the torque sensor, together with the distance sensor and together with the temperature sensor, is or are disposed on a further linear carriage, and
   wherein the further linear carriage is disposed on the electrically-operated linear carriage, able to be moved in the same direction as the latter, is pushed by a spring into a stop position on the electrically-operated linear carriage and is moved again out of the stop position against the force of the spring.

5. The torque sensor arrangement as claimed in claim 3, wherein the torque sensor, together with the distance sensor or together with the temperature sensor, is or are disposed on a further linear carriage, and
   wherein the further linear carriage is disposed on the electrically-operated linear carriage, able to be moved in the same direction as the latter, is pushed by a spring into a stop position on the electrically-operated linear carriage and is moved again out of the stop position against the force of the spring.

6. The torque sensor arrangement as claimed in claim 3, wherein the torque sensor, together with the distance sensor and together with the temperature sensor, is assigned a spacer, which projects in a direction beyond the torque sensor and beyond the distance sensor and the temperature sensor in which the object of which the torque is to be determined is to be disposed in relation to the torque sensor.

7. The torque sensor arrangement as claimed in claim 3, wherein the torque sensor, together with the distance sensor or together with the temperature sensor, is assigned a spacer, which projects in a direction beyond the torque sensor and beyond the distance sensor and the temperature sensor in which the object of which the torque is to be determined is to be disposed in relation to the torque sensor.

8. The torque sensor arrangement as claimed in claim 7, further comprising a housing with an opening for the torque sensor, an opening for the distance sensor and an opening for the temperature sensor and a measurement position, which the electrically-operated linear carriage has in which the torque sensor, together with the distance sensor and together with the temperature sensor is disposed in the area of the respective opening.

9. The torque sensor arrangement as claimed in claim 8, wherein the spacer projects beyond the housing when the electrically-operated linear carriage is located in the measurement position.

10. The torque sensor arrangement as claimed claim 1, wherein an active protection device connected to the distance sensor for receiving the distance signal is present, which monitors the distance to an object of which the torque is to be determined and moves the electrically-operated linear carriage away from the object when this distance reaches of falls below a predetermined minimum distance.

11. The torque sensor arrangement as claimed in claim 1, further comprising an evaluation unit, which is connected to the torque sensor and the distance sensor for receiving the respective signals and determines the torque of the object, of which the torque is to be determined taking into account the distance from the object.

12. The torque sensor arrangement as claimed 3, further comprising an evaluation unit connected to the torque sensor and the temperature sensor for receiving the respective signals and determines the torque of the object of which the torque is to be determined taking into account the temperature of the object.

13. The torque sensor arrangement as claimed in claim 1, wherein the torque sensor is a magnetoelastic torque sensor.

14. A shaft, comprising:
   a shaft section having a torque sensor arrangement,
   wherein the torque sensor arrangement is as claimed in claim 1.

15. The shaft as claimed in claim 14, wherein at least two torque sensor arrangements are present in the shaft section.

* * * * *